US009953295B2

(12) United States Patent
Hughes et al.

(10) Patent No.: US 9,953,295 B2
(45) Date of Patent: *Apr. 24, 2018

(54) MANAGEMENT OF EVENT CONTEXTS USING BOOKEND CONTEXTS

(71) Applicant: International Business Machines Corporation, Armonk, NY (US)

(72) Inventors: Samuel D. Hughes, Winchester (GB); Doina L. Klinger, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 393 days.

This patent is subject to a terminal disclaimer.

(21) Appl. No.: 14/697,727

(22) Filed: Apr. 28, 2015

(65) Prior Publication Data

US 2016/0321343 A1    Nov. 3, 2016

(51) Int. Cl.
*G06F 7/00* (2006.01)
*G06F 17/30* (2006.01)
*G06Q 10/10* (2012.01)
*G06Q 10/08* (2012.01)

(52) U.S. Cl.
CPC ......... *G06Q 10/10* (2013.01); *G06Q 10/0833* (2013.01)

(58) Field of Classification Search
CPC ............. G06F 17/30; G06F 17/30598; G06F 17/30442; G06F 17/5022; G06Q 10/10; G06Q 10/0833; G06Q 10/06311
See application file for complete search history.

(56) References Cited

U.S. PATENT DOCUMENTS

| 7,725,429 | B2 | 5/2010 | Rangadass |
| 8,327,384 | B2 | 12/2012 | Paknad et al. |
| 8,856,087 | B2 | 10/2014 | Greene et al. |
| 8,874,500 | B2 * | 10/2014 | Sandholdt ............ G06Q 10/06 705/320 |

(Continued)

OTHER PUBLICATIONS

Brent, K., "IBM Integration Bus V10 Open Beta is now available", IBM Integration Community, May 1, 2014, pp. 1-2. https://www.ibm.com/developerworks/community/blogs/c7e1448b-9651 . . . (Last accessed: Apr. 22, 2015 at 11:10 AM).

(Continued)

*Primary Examiner* — Azam Cheema
(74) *Attorney, Agent, or Firm* — Laura E. Gisler

(57) ABSTRACT

Event data management is disclosed. Event data management can include receiving a first set of event data including events classified using local contexts. Event data management can include receiving a second set of event data including one or more event data classified using the local contexts and using a global context. Event data management can include determining a first subset of event data corresponding to a first data flow and a second subset of event data corresponding to a second data flow. Event data management can include establishing a global relationship between the first and second data flow. Event data management can include receiving a third set of event data corresponding to the first data flow and having a local bookend identifier. Event data management can include clearing, in response to determining that the third event datum includes the local bookend identifier, the first subset of event data.

20 Claims, 8 Drawing Sheets

(56) References Cited

U.S. PATENT DOCUMENTS

| | | | |
|---|---|---|---|
| 2009/0320047 A1* | 12/2009 | Khan | G06F 9/542 719/318 |
| 2010/0223446 A1* | 9/2010 | Katariya | G06F 11/3495 712/220 |
| 2013/0097662 A1* | 4/2013 | Pearcy | G06F 21/577 726/1 |
| 2013/0117229 A1 | 5/2013 | Jain et al. | |
| 2013/0219292 A1 | 8/2013 | Vins et al. | |
| 2013/0332240 A1 | 12/2013 | Patri et al. | |
| 2014/0250057 A1 | 9/2014 | Rangadass | |
| 2016/0321342 A1* | 11/2016 | Hughes | G06F 17/30598 |

OTHER PUBLICATIONS

Frischmuth et al., "Towards Linked Data based Enterprise Information Integration", Proceedings of the Workshop on Semantic Web Enterprise Adoption and Best Practice WASABI 2013, (2013), pp. 1-9. http://ceur-ws.org/Vol-1106/paper3.pdf.

He et al., "Integration of Distributed Enterprise Applications: A Survey", IEEE Transactions on Industrial Informatics, vol. 10, No. 1, Feb. 2014, pp. 35-42, (Original Publication Mar. 6, 2012). DOI: 10.1109/TII.2012.2189221.

Hohpe et al., "Solving Integration Problems Using Patterns", Enterprise Integration Patterns: Designing, Building, and Deploying Messaging Solutions, Chapter 1, © 2003 Gregor Hohpe, Bobby Woolf, pp. 1-20. http://www.eaipatterns.com/Chapter1.html. (Last accessed: Oct. 10, 2014 at 10:50 AM).

Hughes et al., "Management of Event Contexts Using Bookend Events", U.S. Appl. No. 14/697,715, filed Apr. 28, 2015.

Jandaghi et al., "Advanced Data Integration Solution for Enterprise Information Systems", International Journal of Academic Research in Business and Social Sciences, Dec. 2012, vol. 2, No. 12, pp. 140-144, ISSN: 2222-6990.

List of IBM Patents or Patent Applications Treated as Related.

* cited by examiner

MANAGEMENT OF EVENT CONTEXTS USING BOOKEND CONTEXTS

BACKGROUND

The present disclosure relates to event processing, and more specifically, to managing relationships between event data in an event processing system.

Event processing can be used to track various events related to occurrences (e.g. things that happen). In some instances, an event processing system can be configured to produce a summary view of the tracked events, which could then be used by the user to analyze the tracked occurrences to make various conclusions.

SUMMARY

According to embodiments of the present disclosure, a method of event data management is disclosed. The method can include receiving a first set of event data indicating computer tracked occurrences. The first set of event data can include one or more events classified using local contexts, the local contexts indicating correspondence to a plurality of data flows. The method can include receiving a second set of event data indicating computer tracked occurrences, the second set of event data including one or more event data classified using the local contexts and using a global context, the global context indicating correspondence to a computer tracked transaction, the computer tracked transaction including one or more of the plurality of data flows. The method can include determining, using the local contexts, a first subset of event data from the first and second sets of event data, the first subset of event data corresponding to a first data flow of the plurality of data flows, and determining a second subset of event data from the first and second sets of event data, the second subset of event data corresponding to a second data flow of the plurality of data flows. The method can include determining, using the global context, a first event datum of the first subset and a second event datum of the second subset that corresponds to the computer tracked transaction. The method can include establishing, in response to determining the first event datum and the second event datum that correspond to the computer tracked transaction, a global relationship between the first data flow and the second data flow, the global relationship indicating correspondence to the computer tracked transaction. In embodiments the method can include receiving a third set of event data indicating computer tracked occurrences, the third set of event data including a third event datum classified, using a local context, as corresponding to the first data flow, the third event datum having a local bookend identifier, the local bookend identifier indicating an end to the first data flow of the plurality of data flows. In embodiments, the method can include adding, using the local context, the third event datum to the first subset of event data and clearing, in response to determining that the third event datum includes the local bookend identifier, the first subset of event data from computer memory.

Embodiments of the present disclosure are directed to a system of event data management. The system can include a processor and a computer readable storage medium having program instructions embodied therewith. The program instructions can be executable by the processor to cause the system to receive a first set of event data indicating computer tracked occurrences, the first set of event data including one or more events classified using local contexts, the local contexts indicating correspondence to a plurality of data flows. The program instructions can be executable by the processor to cause the system to receive a second set of event data indicating computer tracked occurrences, the second set of event data including one or more event data classified using the local contexts and using a global context, the global context indicating correspondence to a computer tracked transaction, the computer tracked transaction including one or more of the plurality of data flows. The program instructions can be executable by the processor to cause the system to determine, using the local contexts, a first subset of event data from the first and second sets of event data, the first subset of event data corresponding to a first data flow of the plurality of data flows, and determining a second subset of event data from the first and second sets of event data, the second subset of event data corresponding to a second data flow of the plurality of data flows. The program instructions can be executable by the processor to cause the system to determine, using the global context, a first event datum of the first subset and a second event datum of the second subset that corresponds to the computer tracked transaction. The program instructions can be executable by the processor to cause the system to establish, in response to determining the first event datum and the second event datum that corresponds to the computer tracked transaction, a global relationship between the first data flow and the second data flow, the global relationship indicating correspondence to the computer tracked transaction. The program instructions can be executable by the processor to cause the system to receive a third set of event data indicating computer tracked occurrences, the third set of event data including a third event datum classified, using a local context, as corresponding to the first data flow, the third event datum having a local bookend identifier, the local bookend identifier indicating an end to the first data flow of the plurality of data flows. The program instructions can be executable by the processor to cause the system to add, using the local context, the third event datum to the first subset of event data and clear, in response to determining that the third event datum includes the local bookend identifier, the first subset of event data from computer memory.

Embodiments of the present disclosure are directed to a computer program product for event data management. The computer program product can include a computer readable storage medium having program instructions embodied therewith, wherein the computer readable storage medium is not a transitory signal per se. The program instructions can be executable by a computer to cause the computer to perform a method. The method can include receiving a first set of event data indicating computer tracked occurrences. The first set of event data can include one or more events classified using local contexts, the local contexts indicating correspondence to a plurality of data flows. The method can include receiving a second set of event data indicating computer tracked occurrences, the second set of event data including one or more event data classified using the local contexts and using a global context, the global context indicating correspondence to a computer tracked transaction, the computer tracked transaction including one or more of the plurality of data flows. The method can include determining, using the local contexts, a first subset of event data from the first and second sets of event data, the first subset of event data corresponding to a first data flow of the plurality of data flows, and determining a second subset of event data from the first and second sets of event data, the second subset of event data corresponding to a second data flow of the plurality of data flows. The method can include determining, using the global context, a first event datum of the first subset and a second event datum of the second subset that corresponds to the computer tracked transaction. The method can include establishing, in response to determining the first event datum and the second event datum that correspond to the computer tracked transaction, a global relationship between the first data flow and the second data flow, the global relationship indicating correspondence to the computer tracked transaction. In embodiments the method can include receiving a third set of event data indicating computer tracked occurrences, the third set of event data including a third event datum classified, using a local context, as corresponding to the first data flow, the third event datum having a local bookend identifier, the local bookend identifier indicating an end to the first data flow of the plurality of data flows. In embodiments, the method can include adding, using the local context, the third event datum to the first subset of event data and clearing, in response to determining that the third event datum includes the local bookend identifier, the first subset of event data from computer memory.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
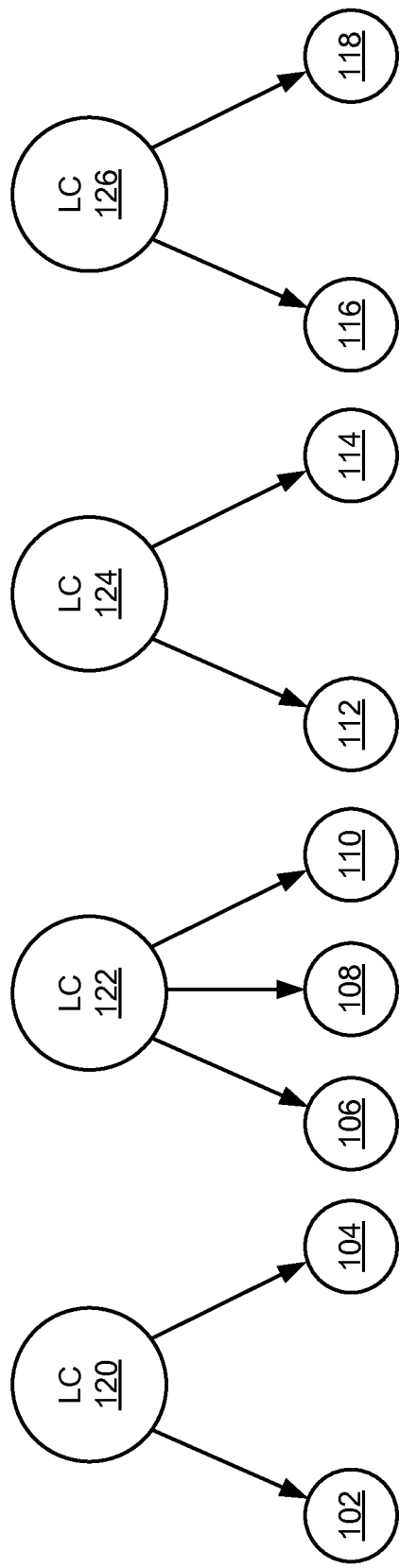
FIGS. 1A-1G depicts a series of example diagrams of events classified according to context data, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to event processing, more particular aspects relate to managing relationships between event data in an event processing system. While the present disclosure is not necessarily limited to such applications, various aspects of the disclosure may be appreciated through a discussion of various examples using this context.

Consistent with embodiments, event processing can be used to track various events related to occurrences (e.g. things that happen). The tracked events can be used to assist a user in determining various conclusions. For example, an event processing system could be used to track events across various layers of an organization. The tracked events could include specific occurrences such as sales leads, customer orders, customer service calls, or other occurrences in the organization. In some embodiments, the event processing system can be configured to produce a summary view of the tracked events, which could then be used by the user to analyze the tracked occurrences. In embodiments, the summary view could include various information related to what went on in the various events with structured drilled down information. As used herein, events tracked by an event processing system can be referred to as event data.

For example, a user interacting with an event processing system configured to track events related to customer orders might see "order has completed" and a summary, generated by the system, of event data related to the order. If an error occurs at some point in the customer order, a user might see "order incomplete" and a summary of event data. By monitoring the events that have been emitted in a given context, embodiments of the present disclosure can assist in understanding where the processing of the order has failed, for example, with a situation of product not in stock or the delivery was attempted but it was unsuccessful. In embodiments, a user could use the summary to determine, based on the event data, what aspect (e.g. event) of the ordering process was an error and what functioned properly.

According to embodiments, event processing can include using contextual data to build and maintain relationships between event data. Described further herein, in various embodiments, event data can include context data for building relationships between event data in the system.

In some instances, a user tracking customer orders might track various events generated by orders, but without context data it could prove difficult for the user to determine which events correspond with which orders. For example, an event processing system could be configured to track events related to customer orders for goods.

Accordingly, in embodiments, one or more of the events could include contextual data that identifies the order which is the origin of the event. The event processing system could be configured to identify relationships (e.g. relationships between each event and each customer order) between events based on the contextual data, and build and maintain relationships between the received events in the event processing system. Based on the relationships, a user could more easily identify which events are associated with what customer order. Additionally, in the case of an error in the order, the user could identify which event of the order encountered an error.

In some embodiments, each order could be made up of various parts, such as payment verification, shipping verification, receipt of customer information, and other various parts. In embodiments, event data could include contextual data that identifies the event data based on context levels. In embodiments, context levels include higher level contexts and lower level contexts, where one or more lower level contexts make up higher level contexts. Thus, for example, a high level context could be the originating order of the event data and a lower level of context could include a part of the order (e.g. shipping verification, receipt of customer information, etc.) the event is related to. Based on the contextual data, the event processing system can build and maintain relationships between event data based on the order, and parts of the order. Accordingly, a user could use the relationships to more easily analyze event data. For example, the user could use the relationships to determine that in a particular customer order, a portion of event data is be related to payment verification and a second portion is related to receipt of customer information. In embodiments, higher level context is referred to herein as a global context. In embodiments, and lower level context is referred to herein as a local context. In embodiments, a local context could contain other local contexts. For example, described further herein, the local context associated with a part of an order can be the parent of local contexts associated with sub components of that part.

Accordingly, in embodiments, the event processing system can be configured to build and maintain nested relationships between events based on context data identifying higher and lower levels of context. In embodiments, events can be nested to an arbitrary depth. As described herein, the event data can be nested based on a global context that corresponds to a high level transaction, such as a customer order, and to one or local contexts that correspond to a lower level context, such as data flows that make up parts of the customer order.

Described further herein, in embodiments, event processing can include determining, based on contextual data, when to store event data in the event processing system. In some embodiments, based on contextual data, event processing can include determining based on contextual data, when to clear stored event data from memory in the event processing system.

Referring now to FIGS. 1A-G, a series of example diagrams of events classified according to context data can be seen according to embodiments of the present disclosure.

FIG. 1A, consistent with embodiments of the present disclosure, depicts event data 102-118 classified according to local contexts 120-126. As described herein, event data 102-118 are occurrences that are tracked by an event processing system, according to embodiments of the present disclosure. In embodiments, the event processing system is a general purpose system of grouping events and using the hierarchical contexts to summarize the event data. The system could be used to track various types of events that belong to various types of contexts. For example, the event processing system could be used for processing of car insurance claims. For example, a claim ID for the insurance claim could be classified as a global context, car registration IDs, patient numbers (for injury processing), replacement car registration IDs, etc., could each be local contexts. The start event for the global could be the initiation of a claim. The end event for each global context could be either claim approval or claim rejection. Thus, event data 102-118 can correspond to those occurrences.

In embodiments, events are received (e.g. tracked) in real time, and thus, event data 102-118 could correspond to a series of events that occurred over a period of time. In some embodiments, one or more of the events are received individually as they occur. In some embodiments, one or more of the event data 102-118 represents events that are received simultaneously in groups. In embodiments, the event data 102-118 is received automatically by the event processing system. For example, the event processing system could be configured to detect and automatically log events as they occur. In some embodiments, a user can manually enter in event data 102-118. In some embodiments, event data 102-118 could be received by a combination of automatic tracking and manual entry. In embodiments, the user manually configures the events. For example, the user can specify when the events are being emitted and what data is used to populate the event fields, such as the various contextual data (e.g. local contexts, global contexts, and parent contexts). In embodiments, once these definitions have been made available to the system, the events are automatically emitted with their fields filled in with values based on the definitions.

In various embodiments, each of the event data 102-118 can include associated context data. As described herein, context data can be characteristics of tracked events that can be used by the event processing system to build data relationships. For example, as seen in FIG. 1A, the contextual data is used to classify the event data 102-118 into nested structures based on the event's relationships with local contexts 120-126. In some embodiments, these classifications are called context partitions. Described further herein, contextual data can be used to build additional structures. For example, described further herein, context data can be used to build more complex structures of data relationships based on higher and lower levels of context between event data 102-118. Additionally, in embodiments, context data can be used to determine when the event processing system should save or clear event data from memory.

According to various embodiments, context data is data that identifies one or more characteristics of an event. In embodiments the context data is used to classify event data 102-118 into one or more sets (e.g. local contexts 120-126), where events in each set share one or more characteristics. In embodiments, characteristics of the event could be the source of the event (e.g., what caused the event.).

For example, in embodiments, an event processing system could be configured to track events related to customer orders. Event data 102-118 could represent occurrences related to each order. Accordingly, event data 102-118 could include context data that identifies what customer order it's associated with. Thus, the system could structure events based on what order the events were for. This can prove beneficial, as the user could use this information to identify which event data 102-118 correspond to which customer orders.

In some embodiments, the context data can identify various levels of context. For example, each customer order could be made up of various data flows (e.g. processes that emit events). For example, the data flows could include, processing payment, payment confirmation, shipping confirmation, or other aspects of customer orders. The context data could include global context that corresponds to a higher level transaction (e.g. customer order) and local context that corresponds to a data flow (e.g. aspects that make up each customer order).

Described further herein, in embodiments, each local context, can have its own "start" and "end" local bookend events that indicate when a local context has begun and/or completed. Described further herein, the global context can have global bookend events that indicate when a global context has begun and/or completed. In some embodiments, the global context can have bookend local contexts. For example, for order processing, a local context of order confirmation could be the starting context for the global context, the delivery confirmation could be the ending context, with other local contexts (such as billing, and shipping) being parts of the global context.

As seen in FIG. 1A, event data 102-118 is classified according to four local contexts 120-126. For example event data 102, 104 have been classified according to local context 120, event data 106-110 have been classified according to local context 122, event data 112, 114 have been classified according to local context 124, and event data 116, 118 have been classified according to local context 126.

In embodiments, as described herein, each of the local contexts 120-126 correspond to a data flow in the event processing system. In embodiments, a data flow is a process that emits/generates one or more events. For example, in embodiments, the data flow could be some business function that emits events at different moments to make it possible to track the various points in the processing. As a consequence of the data flow, events 102-118 are emitted. When those events are emitted, in embodiments, the events have a local context identifier that is generated by the system. For example, events from one flow instance will have the same local context identifier. In embodiments, the user can configure the local context explicitly rather than having it system generated. The user could specify the local context as an Xpath into the input data. In some instances, numerous different events are fired during the life of a flow. In embodiments, one or more of these events can be associated with a local context. In some embodiments, the first event fired within that context starts the monitoring/logging for that context in the event processing system.

In embodiments, the event processing system can track multiple events from multiple flows. This can prove beneficial in some instances, such as when tracking integration solutions, as integration solutions can span multiple flows and each flow can emit events at key points. In some instances, requirements to monitor integration solutions requires monitoring these events across one or more of the flows.

In embodiments, a user can define various parameters for a system in the integration space. For example in embodiments, a user can selects the flows that they want to monitor as a group. In some embodiments, the user can define the events for the flows.

For example, in embodiments, the event data 102-118 and the context data are manually defined. In embodiments, if the user wanted to track events related to customer orders, the user could define what particular occurrences an event processing system would track. Similarly, the user could define context information based on a characteristic of the events. For example, the user could define what data flows make up a customer order. And what events are generated by the defined data flows. As described herein, the user can define the data flows that are the starting and ending contexts of the order processing.

Figure 1B:
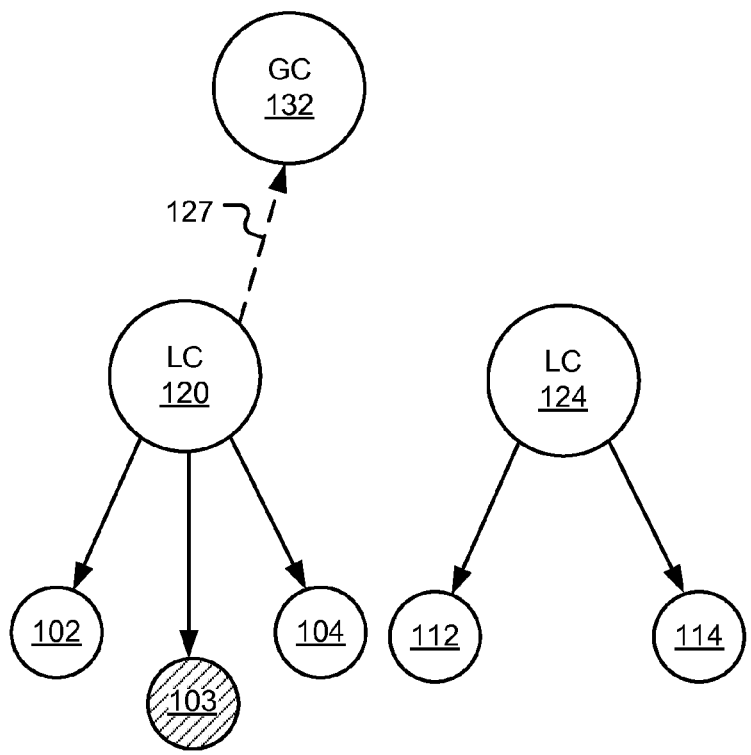

Referring to FIG. 1B, consistent with embodiments of the present disclosure, event data 102-104, 112, and 114 can be seen classified according to local contexts 120, 124. As seen in FIG. 1B, event data 103 is received and is classified under local context 120. In embodiments, the event data 103 is classified using a local context identifier included with event data 103 that corresponds to local context 120. As described herein, in embodiments, the event processing system can identify the local context identifier associated with event data 103 and classify event data 103 under local context 124. In embodiments, event data 103 is received subsequent to events 102 and 104.

Additionally, event data 103 includes a global context identifier that corresponds to global context 132. As described herein, the global context 132 can be a classification for events that belong to a higher level context of a nested structure of events that includes higher and lower level contexts. For example, in embodiments, the global context could correspond to a single transaction that includes one or more data flows (e.g. local contexts) that make up that transaction. The event data 102-104, 112, and 114 could correspond to occurrences that are emitted from the data flows.

In embodiments, the event processing system receives event data 103 and creates the global context 132 if it is the first instance of an event that includes global context identifier corresponding to global context 132. In embodiments, because the local context 120 includes event data 103 and because event data 103 includes the global context identifier corresponding to global context 132, the event processing system establishes a global relationship 127 between the local context 120 and the global context 132. In embodiments, each of the event data 112, 113, and 114 are then classified as belonging to the global context 132, as each of the events are a member of local context 124 and local context is now a member of the global context 132.

In embodiments, the global relationship 127 indicates the nested relationship of the data flow represented by local context 124 and a transaction represented by global context 132. Accordingly, the event data 102-104, 112, and 114 in FIG. 1B are structured in nested relationships with local context 120 and global context 132 that depicts how event data 102, 103, and 104 correspond to the data flow represented by local context 120 and that the data flow corresponds to the computer tracked transaction represented by global context 132.

In embodiments, the global identifier does not need to be included in the first event received under local context 120. For example, event data 102 and 104 could be received and classified according to local context 120. Subsequently, event data 103 could be received and event data 103 could include the global identifier. Accordingly, event data 102 and 104 is then classified as belonging to global context 132 based on the global relationship 127 established in response to receiving event data 103. Thus, event data 102 and 104 do not require global context information in order to be classified according to a global context.

In embodiments it can prove beneficial to start some form of transaction (e.g. a global context) which logs all the events for all the contexts currently in progress. In embodiments, some or all of the local contexts may be in progress when the transaction is started, and some events may already have been logged. These need to be included in the new transaction. The global relationship 127 can include event data that is included in local contexts which are in progress prior to the beginning of global context 132.

As described herein, in embodiments, the event data and the context data are manually defined. In embodiments, the user can specify the global context for a local context, by choosing for one event for the local context by specifying an XPath. For example, a system could be configured to track events for a processing an order. The processing could be made of a number of parts, such as, checking the inventory, credit checking for the customer, billing, and delivery. For this processing, events can be configured to be emitted at various points like side effects or debugging points to enable the monitoring of the processing. If a particular event has been received (e.g. billing), then the processing has reached this point. When troubleshooting, the absence of a billing event can indicate that this part has not been reached. Tracking or monitoring events related to this order can assist in understanding what has happened to that order.

For example, in embodiments, when the user configures the event definition, he can specify what data to copy in the event. For example, the input data for the order might be something like:

```
< Order>
    <ID> 123 </ID>
    <Date> April 14, 2015 </Date>
    <Value> $1000 </Value>
    <parts>
        <part> tablet</part>
        <part> fancy tablet cover</part>
    </parts>
</Order>
```

The event can be configured to have a global context identifier as value the /Order/ID XPath. (An Xpath is a path into an XML element). In embodiments, this means that before the event is emitted, the value of the Xpath, for example, global context 132 is set as the global context for the event.

Described further herein, in embodiments, each local context (corresponding to a data flow as mentioned herein) can have its own bookend events. So if there is a local context for the billing of the customer, the user can configure an event that represents the start of the billing process and one or more that represent the end (successful or not) of the billing process. The user might configure additional events for each local context. In addition, as part of the configuration of the global context, the user can indicate the local contexts. For example, the user can indicate the data flows that represent the start and the end of the global contexts.

Described further herein, in embodiments, the global context 132 can be defined based on two events that include context data that marks those events as global bookend events. Global bookend events can be classified as "start" and "end", along with a global context identifier to mark the boundary of a global context. In embodiments, this becomes the metadata for a global context. In embodiments, an "end" event can end the logging of events for that global context. Accordingly, in embodiments, once the end event is received, events fired during the life of the global context are logged, and the context closed and freed from memory. In some embodiments, local contexts can be classified as "start" and "end" contexts for the global contexts.

Figure 1C:
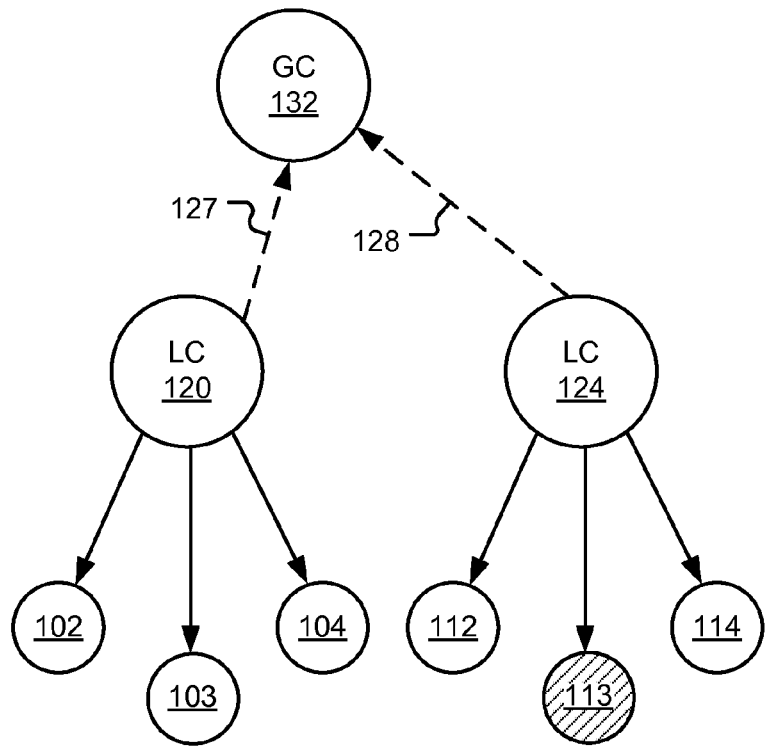

Referring to FIG. 1C, consistent with embodiments of the present disclosure, event data 102-104, 112-114 can be seen classified according to local contexts 120, 124. As seen in FIG. 1C, event data 113 is received and is classified under local context 124. Similar to embodiments described herein, the event data 113 is classified using a local context identifier included with event data 113 that corresponds to local context 124. In embodiments, the event processing system can determine the local context identifier associated with event data 113 and subsequently classify event data 113 under local context 124. Additionally, event data 113 includes a global context identifier that corresponds to global context 132.

Similar to the description with reference to FIG. 1B, local context 124 is then classified as belonging to global context 132. Since global context 132 has already been created upon receiving event data 103, the event processing system can establish a second global relationship 128 between the local context 124 and the global context 132. In embodiments, each of the event data 112, 113, and 114 is then classified as belonging to the global context 132, as each of the events are a member of local context 124 and local context 124 is classified under the global context 132.

In some embodiments, as local contexts 120 and 124 both belong to global context 132, the event processing system can establish a global relationship between local contexts 120 and 124 through global relationships 127 and 128.

Figure 1E:
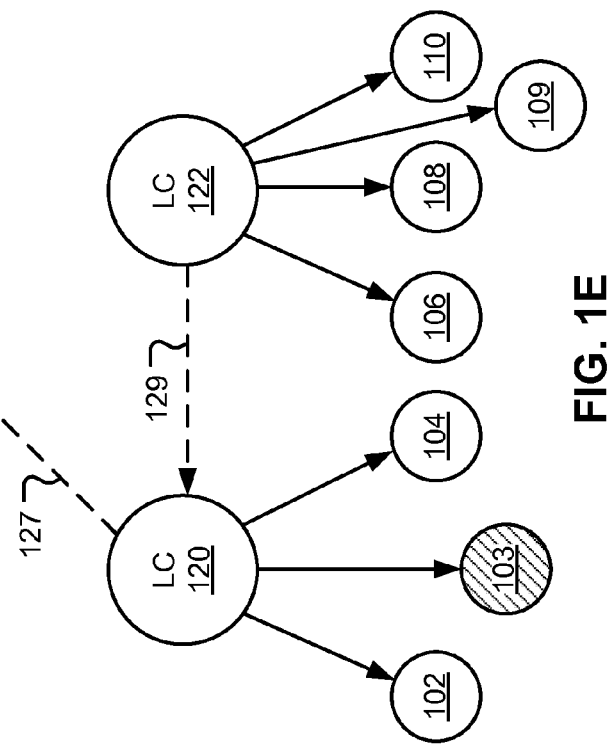
Figure 1D:
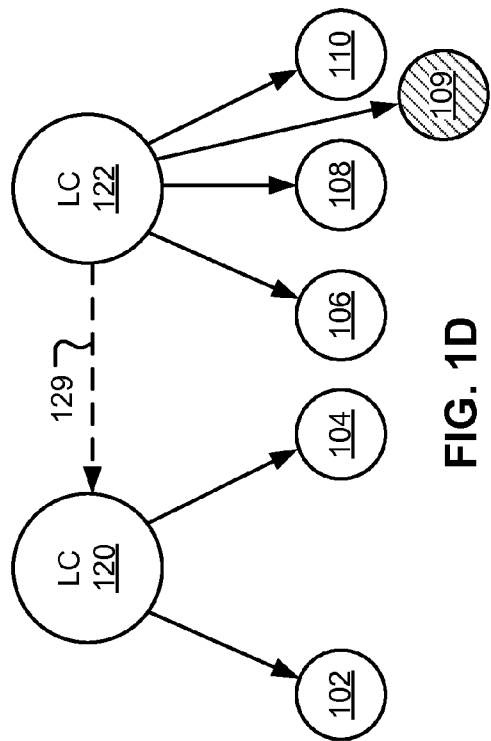

Referring to FIG. 1D, consistent with embodiments of the present disclosure, event data 102, 104, and 106-110 can be seen classified according to local contexts 120 and 122. As seen in FIG. 1D, event data 109 is received and is classified under local context 122. The event data 109 is classified using a local context identifier included with event data 109 that corresponds to local context 122, as described herein.

As seen in FIG. 1D, event data 109 can include a parent context identifier that specifies local context 120 as parent correlator for the event data 109. In embodiments, the parent identifier can give means of grouping events and/or local contexts together that from a request-reply context. For example, for an event processing system configured to track events related to order processing, billing could be implemented in a third party (e.g. SAP) system. The main order processing system can emit an asynchronous request for billing the customer and then continue with other steps. The third party system can processes the billing information and then emit the confirmation if the successful. In embodiments, the main order process will receive this billing confirmation and carry on the completion of the order with the delivery steps. The billing processing within the third party system might emit a number of events with their own local context. If one of these events contains, as the parent context, the local context of the billing request, the system could tie the events (and their corresponding local contexts) together. For example, the system could tie local contexts with a global contest and have the global context span events from multiple systems.

In embodiments, the parent context can be used to create hierarchies between local contexts. For example, a global context can represent a transaction which can include various components. In embodiments, each component can have a sub-component. Each sub-component can have a part. In embodiments, the system could assign a OrderDataFlow for the transaction, a ComponentDataFlow for components a SubComponentDataFlow for sub-component and a PartDataFlow for parts. Starting from the bottom, the events for PartDataFlow could have a local context that is system generated and a parent context that is the sub-component (this value could be retrieved from the input data). The events for SubComponentDataFlow could have a local context set to the sub-componentID and a parent context to the value of the componentID. The events for ComponentDataFlow could have a local context set to the component and the parent context set to the orderID.

In embodiments, the event processing system uses the parent context identifier to establish a parent relationship 129 between local contexts 120 and 122. Event data 109 identifies local context 120 as the parent of local context 122. In embodiments, when the parent relationship 129 is established between local contexts 122 and 120, all events under local context 122 (e.g. event data 106, 108, 109, and 110) are added to the parent context (e.g. local context 120).

In embodiments, the parent identifier does not need to be the first event for that local context. For example, say event data 109 is received subsequent to event data 106, 108, and 110. The event processing system would establish the parent relationship 129 after receiving this event. Previous events (e.g. event data 106, 108, and 110) from this local context 122 do not require the parent identifier to establish the parent relationship 129.

As described herein, in embodiments, the context data are manually defined. In embodiments, the user can specify the parent context for a local context, by choosing for one event for the local context by specifying an XPath, as described herein. For example, the Xpath could be the path into an XML message. The parent context of the event can be configured to have an Xpath value. At runtime, when the system emits the event, it can copy the data found on this Xpath on the input data to the parent context location in the event.

Referring to FIG. 1E, consistent with embodiments of the present disclosure, event data 102-104, and 106-110 can be seen classified according to local contexts 120 and 122. As described with reference to FIG. 1D, a parent relationship 129 exists between local contexts 122 and 120.

As seen in FIG. 1E, event data 103 is received and is classified under local context 120. The event data 103 is classified using a local context identifier included with event data 103 that corresponds to local context 120, as described herein. Event data 103 can be the same or substantially similar as described with reference to FIG. 1B. Event data 103 includes a global context identifier corresponding to global context 132. Accordingly, the event processing system can create global context 132 and establish a global relationship 127. In embodiments, event data 103 can be received subsequent to event data 102, 104, 106-110.

In embodiments, as local context 122 is a child of local context 120, both local contexts 120 and 122 are added to the global context 132. Thus, event data 102, 103, 104, 106, 108, 109, and 110 are all added to global context 132, as events from local context 122 have the parent relationship with local context 120. As described herein, due to the parent relationship 129 between the local contexts, the event data 106-110 classified according to local context 122 are treated as added to local context 120. Thus, adding the events of local context 120 to global context 132 includes adding events of local context 120 and 122.

As described herein, in embodiments, the global identifier in event datum 103 does not need to be the first event for local context 120. For example, say event data 103 is received subsequent to event data 102, 104, 106, 108, 109 and 110. The event processing system would establish the global relationship 127 after receiving this event datum 103 and incorporate event data 102, 104, 106, 108, 109 and 110 as part of the global context through that relationship. Previous events (e.g. event data 106, 108, and 110) from this local context 122 do not require the global identifier to establish the global relationship 127. Accordingly, in embodiments, the event processing system permits events that occurred prior to the start of the transaction (e.g. the global context 132) to be contextually included in the transaction by association.

In some embodiments, the event processing system could generate a various nested structures of arbitrary depths. For example, in embodiments it would be possible to set up a deeper hierarchy, say a local context to a first parent context to a second parent context, to a third parent context, to a global context. In the example, event of each of the local contexts in that chain of parent relationships could be considered as associated with the transaction represented by the global context. In embodiments, the event processing system can use one of the generic method of sharing data between flows to establish these relationships. For example, the system could use cache or one of the nodes that stores data to a side store. In some embodiments, the system could use an application specific data structure.

Figure 1F:
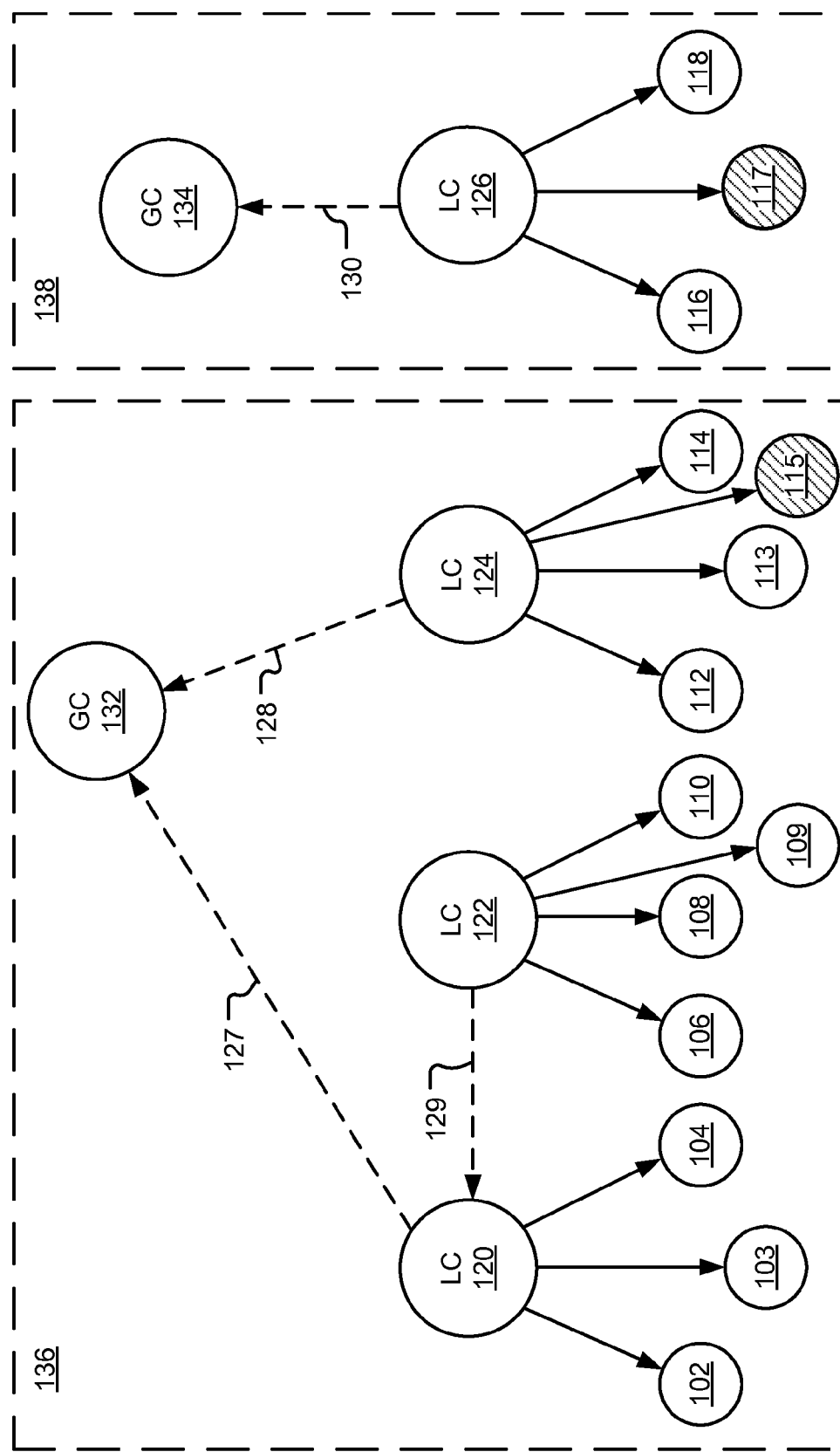

Referring to FIG. 1F, a diagram of the events classified according to the local, global, and parent contexts can be seen, according to embodiments of the present disclosure. As described herein with reference to FIGS. 1A-1E, the diagram shows local contexts 120, 124 including event data 102-104, and 112-114 classified as belonging to global context 132 based on global relationships 127, 128. Similarly, as described herein, local context 122 and event data 106-110 are classified as belonging to, via a parent relationship 129, to local context 120.

In embodiments, FIG. 1F can represent a summary view of events from an event processing system. For example, the diagram could be used to give the user a summary view of what went on in the various transactions and data flows with structured drilled down information. For example, if a user was tracking customer orders as a transaction, a user might see "order has completed" and the summary. If things went wrong with the transaction, a user could use the summary to investigate and the context hierarchy can help to drill down in what part of the transaction the error has occurred.

As described herein, in embodiments, the event processing system can use context data that includes global bookend identifiers, to determine when the transaction represented by the global context starts and when it is finished. For example, if the global context represents customer orders, event data could include a "start" event and "end" event that defines the beginning and end of the customer order. In embodiments, the event processing system can be configured to keep partially built contexts (e.g. event data with no global context) until the event data has a global identifier bound to it.

As seen in FIG. 1F, event data 115 and 117 are received and classified into local contexts 124 and 126, respectively. As described herein, in embodiments, the event data 115 and 117 are classified using a local context identifier included with event data 115 and 117 that corresponds to local contexts 124 and 126 respectively. In embodiments, event data 103 is received subsequent to events 102 and 104. In embodiments, event data 117 includes global identifier corresponding to global context 124. In embodiments, event data 117 includes a global bookend identifier that signals event 117 as the "start" of global context 134. Accordingly, the event processing system can establish tracking for global context 134 and establish a global relationship 130 between the local context 126 and global context 134. Box 138 encloses the event data 116, 117, and 118 that are associated with a second transaction corresponding to global context 134.

Event data 115 can include a global bookend identifier that signals that event data 115 as the "end of the global context 132. As described herein, in embodiments, once a transaction has been completed, the system can be configured to end tracking of the transaction. For example, in FIG. 1F, once event data 115 is received, the event processing system can be configured to end tracking of events enclosed in box 136, that are associated with a first transaction corresponding to global context 132.

In embodiments, the system can be configured to generate metadata based on the transaction and then clear the tracked events from memory in the event processing system. For example, if in response to event data 115 that has been marked as the "end" for the global context 134, the system can record the state of the global context based on data from events or metadata such as timestamps or other metadata. Accordingly, in FIG. 1F the nested contexts of global context 132, local contexts 120-124, and event data 102-115 can be closed by the closing of the global context 134.

In embodiments, described further herein, the event data can include a local bookend identifier for local contexts. For example, event data could include a local bookend identifier for local context 124. In some embodiments, local contexts can be marked as the ending contexts for a global context.

Figure 1G:
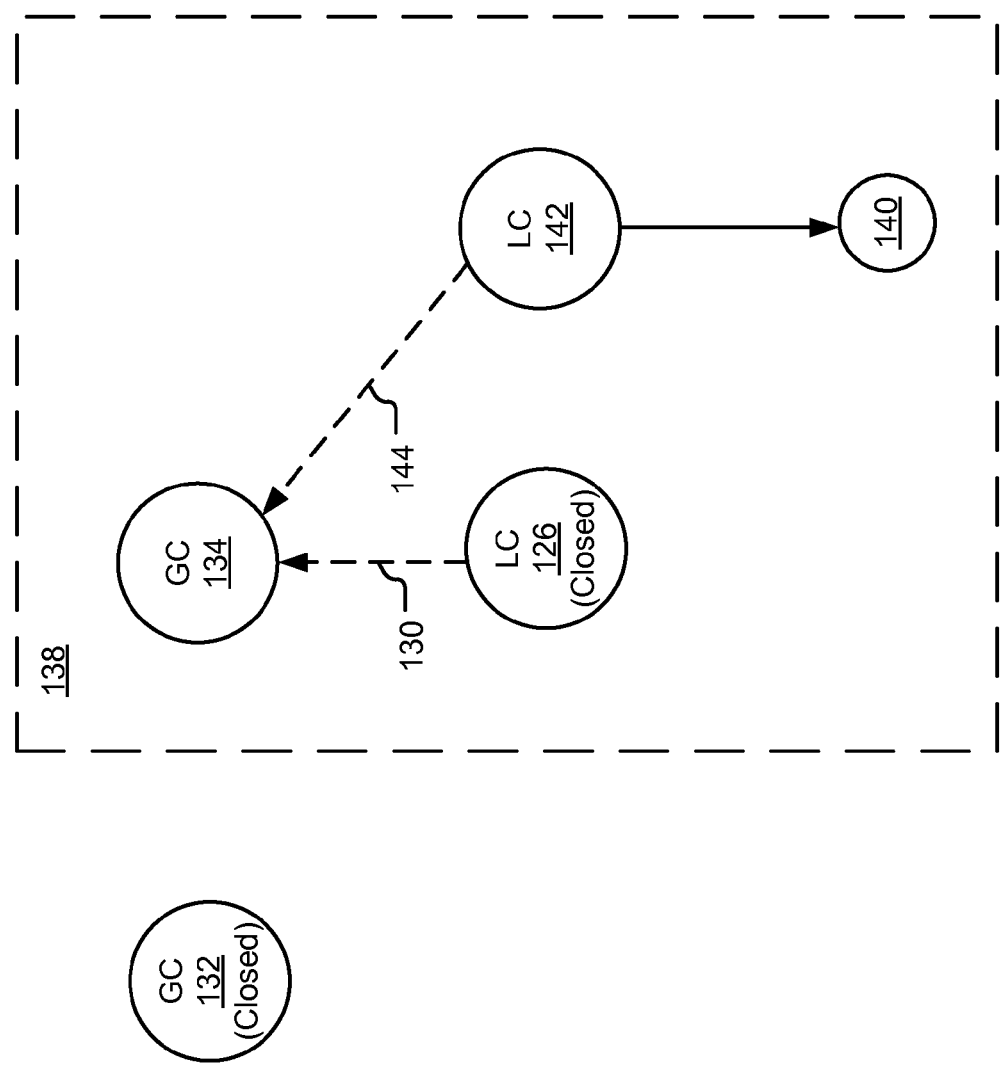

Referring to FIG. 1G, a diagram of events classified according to the local, global, and parent contexts can be seen, according to embodiments of the present disclosure. As described herein with reference to FIGS. 1A-1F, the diagram shows global contexts 132 and 134. Global context 134 corresponds to a second transaction that includes events enclosed in box 138. As described above, global context 132 has been closed by the event processing system. In embodiments, as they are tracked by the event processing system, events associated with the global context 132 are stored in computer memory accessible to the event processing system. The system can then clear events associated to global context 132 from the computer memory once the global context 132 is closed. This can free memory in the system and reduce resource usage.

As described herein, global context 134 remains open and includes local contexts 126 and 142 including event data 140 classified as belonging to local context 142 and global context 134 based on global relationship 144. Similarly, as described herein, local context 126 is classified as belonging to, via the global relationship 130, to global context 130.

As seen in FIG. 1G, local context 126 has been closed. In embodiments, events can include local bookend identifiers that identify a "start" and/or "end" event for various local contexts. This can be similar to the global bookend identifiers that identify "start" and/or "end" events for the global identifiers, as seen in FIG. 1F. In FIG. 1G, local context 126 is closed in response to receiving an event datum (e.g. event datum 117, FIG. 1F) that includes a local bookend identifier. In response, the event processing system can clear events corresponding to the data flow represented by local context 126. For example, in embodiments, the local context 126 can be cleared by clearing events 116, 117, and 118 (FIG. 1F), from memory in the event processing system. In embodiments, local context 142 remains open as it has not yet received a bookend event and can still receive one or more events classified according to local context 142. This can be beneficial as the event processing system can clear portions of events from memory to reduce resource usage, prior to receiving a global bookend identifier, as described herein.

Figure 2:
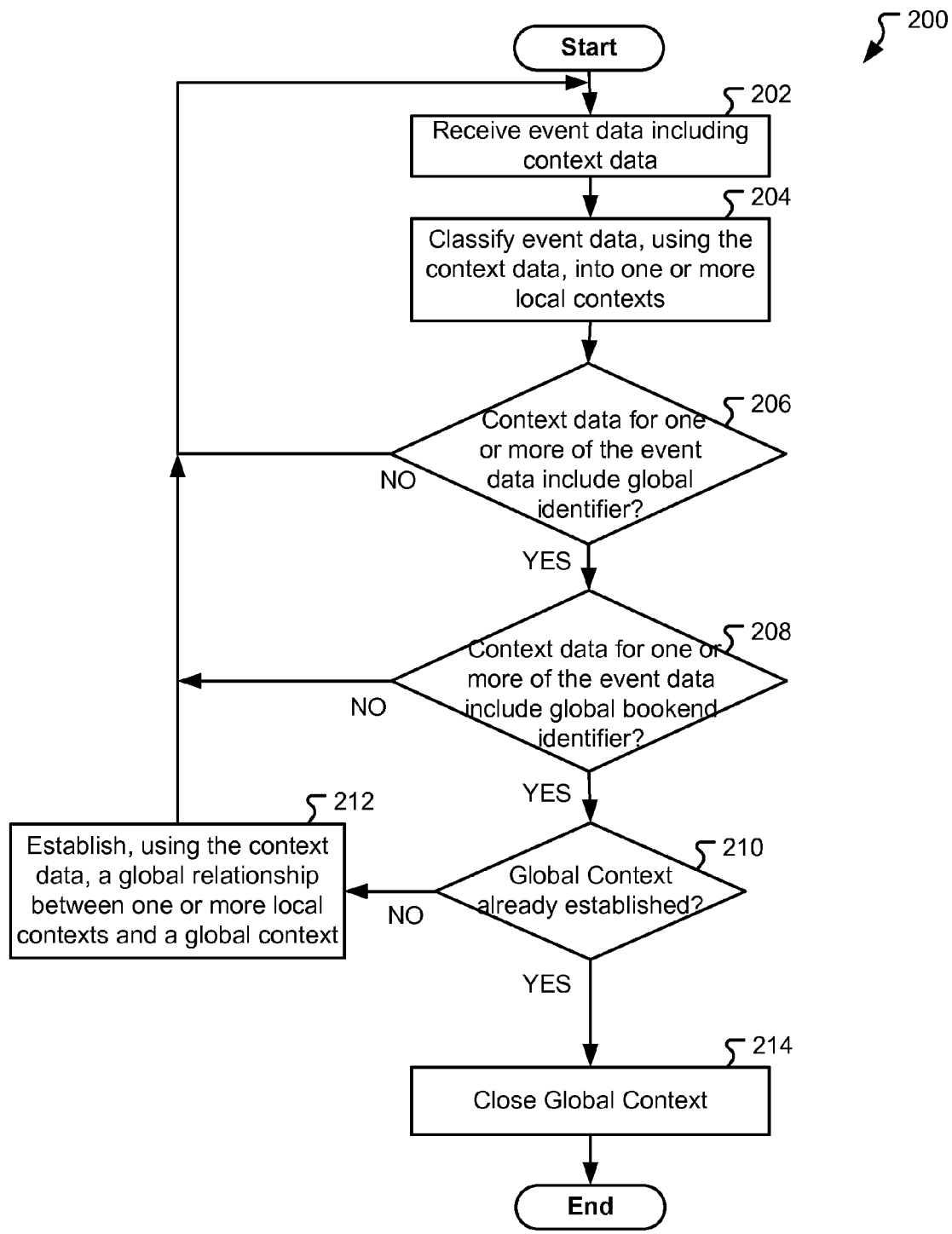
FIG. 2 depicts a flowchart diagram of a method of event data management including using bookend events for global contexts, according to embodiments of the present disclosure.

Referring now to FIG. 2, a flowchart diagram of a method 200 of event data management using global bookend identifiers can be seen, according to embodiments of the present disclosure.

The method 200 can include, in operation 202, receiving event data including context data. Event data can be occurrences tracked by an event processing system, as described herein. As described herein, the event data can include various contextual data that can correspond to characteristics of each particular event datum. For example, a first event datum could include contextual data identifying it as a member of a local context, a member of a global context, as a bookend event for a local context and/or global context, or other identifying information. In embodiments, the local context itself could include contextual information describing it as a bookend context for the global context.

The method 200 can include, in operation 204, classifying event data, using the context data into one or more local contexts. In embodiments, an event processing system can classify event data based on the context data. In embodiments, the event processing system can identify context identifiers such as a global identifier, local identifier, parent identifier, and/or bookend identifier to classify event data into one or more context partitions, as described herein. In embodiments, the identifiers can include tags, serial numbers or other identifiers that correspond to characteristics of the event data. As described herein, in embodiments, the event processing system can classify event data into local contexts based on local identifiers included in one or more of the event data. As described herein, in embodiments, the system can classify event into global contexts based on global identifiers included in one or more of the event data. As described herein, the event processing system can classify event data into parent relationships based on parent identifiers including in one or more of the event data.

If the context data for one or more of the event data includes a global identifier then, in decision block 206, then the method 200 can progress to decision block 208. If the context data does not include a global identifier, then in decision block 206, the method 200 can reset to operation 202. In embodiments, the event processing system can cycle through operations 202-206 receiving events and classifying event data based on context data until one or more of the event data includes a global identifier.

If the context data for one or more of the event data includes a global bookend identifier, then in decision block 208, then the method 200 can progress to decision block 210. As described herein, the global bookend identifier can classify event data as being the "start" or "end" of a global context. In some embodiments, local contexts can be classified as bookend contexts that can signal the "start" or "end" of a global context. For example, in embodiments, the event data can include a local bookend identifier and global bookend identifier. In embodiments, the event data could be the "start" event for the global context if it is the "start" event of the local context that is the start of the global context. Similarly, the event data can be the "end" event for the global context if it is the "end" event of the local context that is the end of the global context. If the context data does not include a global bookend identifier, then in decision block 208, the method 200 can reset to operation 202. In embodiments, if an event datum includes a global identifier but does not include a bookend event, then the global context has already been established and would be classified into the global context in operation 204.

If the global context is not already established, then in decision block 210, the method 200 can progress to operation 212. In embodiments, the method can include, in operation 212, establishing a global relationship between one or more local contexts and a global context. As described herein, in embodiments, if the global context is not already established and event data includes a global bookend identifier, then the event is classified as a "start" event for the global context. Accordingly, the event processing system can establish the global context and establish a global relationship, as described herein, between event data and the corresponding local contexts.

If the global context is already established, then in decision block 210, the method 200 can progress to operation 214. As described herein, if the global context is already established, then the global bookend identifier signals that an event is the "end" of a global context. Accordingly, in embodiments, the event processing system can generate metadata based on the global context and then close the global context.

In some embodiments, clearing the event data corresponding to the global context is further in response to expiration of a time based interval that begins in response to determining that the event data includes the global bookend identifier.

Figure 3:
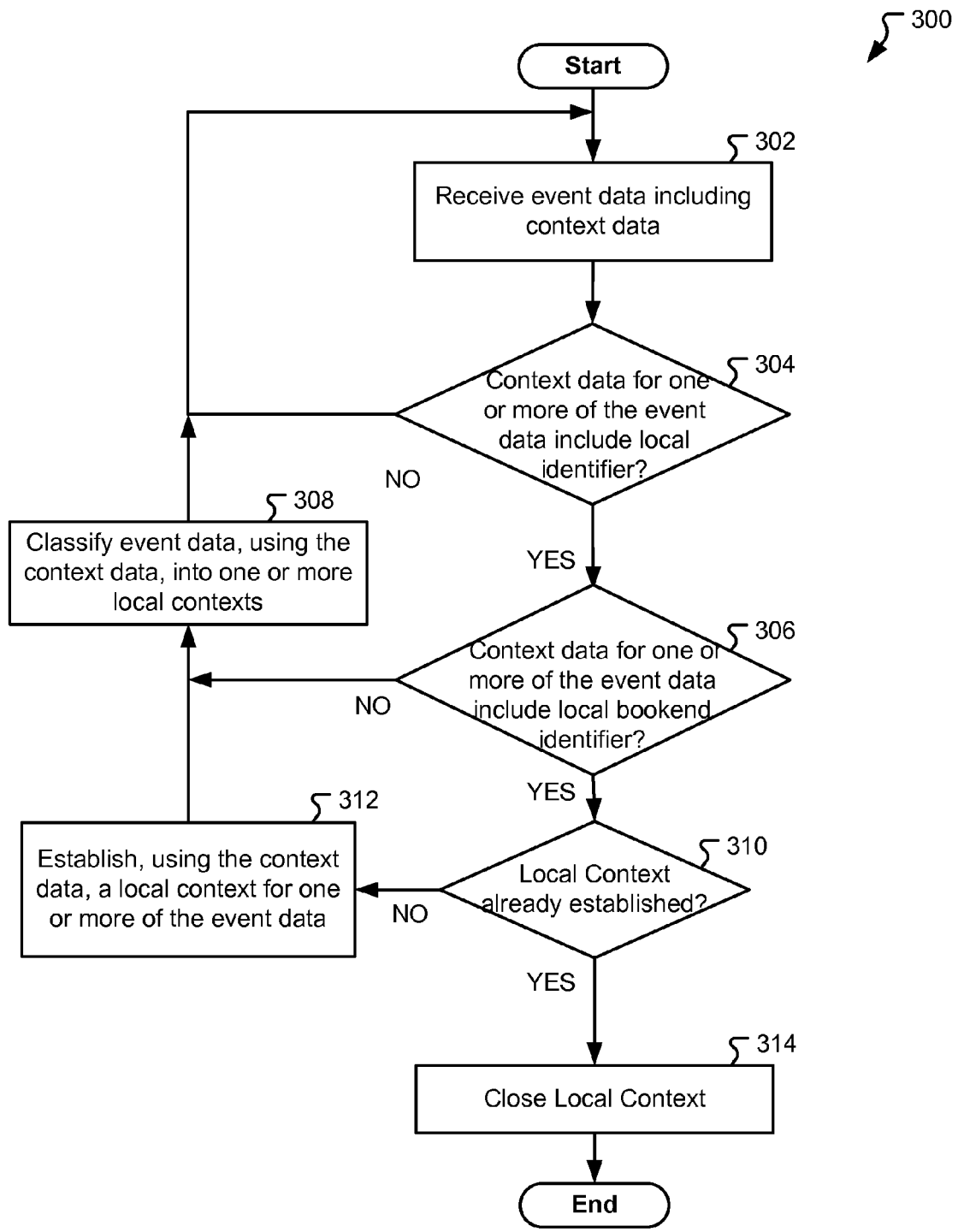
FIG. 3 depicts a flowchart diagram of a method of event data management including using bookend events for local contexts, according to embodiments of the present disclosure.

Referring now to FIG. 3, a flowchart diagram of a method 300 of event data management using local bookend identifiers can be seen, according to embodiments of the present disclosure.

The method 300 can include, in operation 302, receiving event data including context data. As described herein event data can be occurrences tracked by an event processing system. As described herein, the event data can include various contextual data that can correspond to characteristics of each particular event datum. For example, a first event datum could include contextual data identifying it as a member of a local context, a member of a global context, as a bookend event, or other identifying information.

If the context data for one or more of the event data includes a local identifier, then in decision block 304, the method 300 can progress to decision block 306. In embodiments, if the one or more of the event data does not include a local identifier, then in decision block 304, the method can reset to operation 302. In embodiments, the system can receive event data and check to find event data including local identifiers corresponding to a local context until progressing to decision block 306.

If context data for one or more of the event data includes a local bookend identifier, then in decision block 306, the method 300 can progress to decision block 310. As described herein, the local bookend identifier can classify event data as being the "start" or "end" of a local context. If context data for one or more of the event data does not include a local bookend identifier, then in decision block 306, the method 300 can progress to operation 308. In operation 308, the method can include classifying event data using the context data, into one or more of the local contexts. In embodiments, since the event data does not include a local bookend identifier, then the local contexts have already been established and the event does not signify the end of the local context. Accordingly, the event data can be classified according to their corresponding local contexts, as described herein.

If the local context is already established, then in decision block 310, the method 300 can progress to operation 314. As described herein, if the local context is already established, then the local bookend identifier signals that an event is the "end" of a local context. Accordingly, in embodiments, the event processing system can generate metadata based on the local context and then close the local context. In some embodiments, clearing the event data corresponding to the local context is further in response to expiration of a time based interval that begins in response to determining that the event data includes the local bookend identifier.

If the global context is not already established, then in decision block 310, the method 300 can progress to operation 312. In embodiments, the method can include, in operation 312, establishing a local context for one or more of the event data. As described herein, in embodiments, if the local context is not already established and event data includes a local bookend identifier, then the event is classified as a "start" event for the local context.

Figure 4:
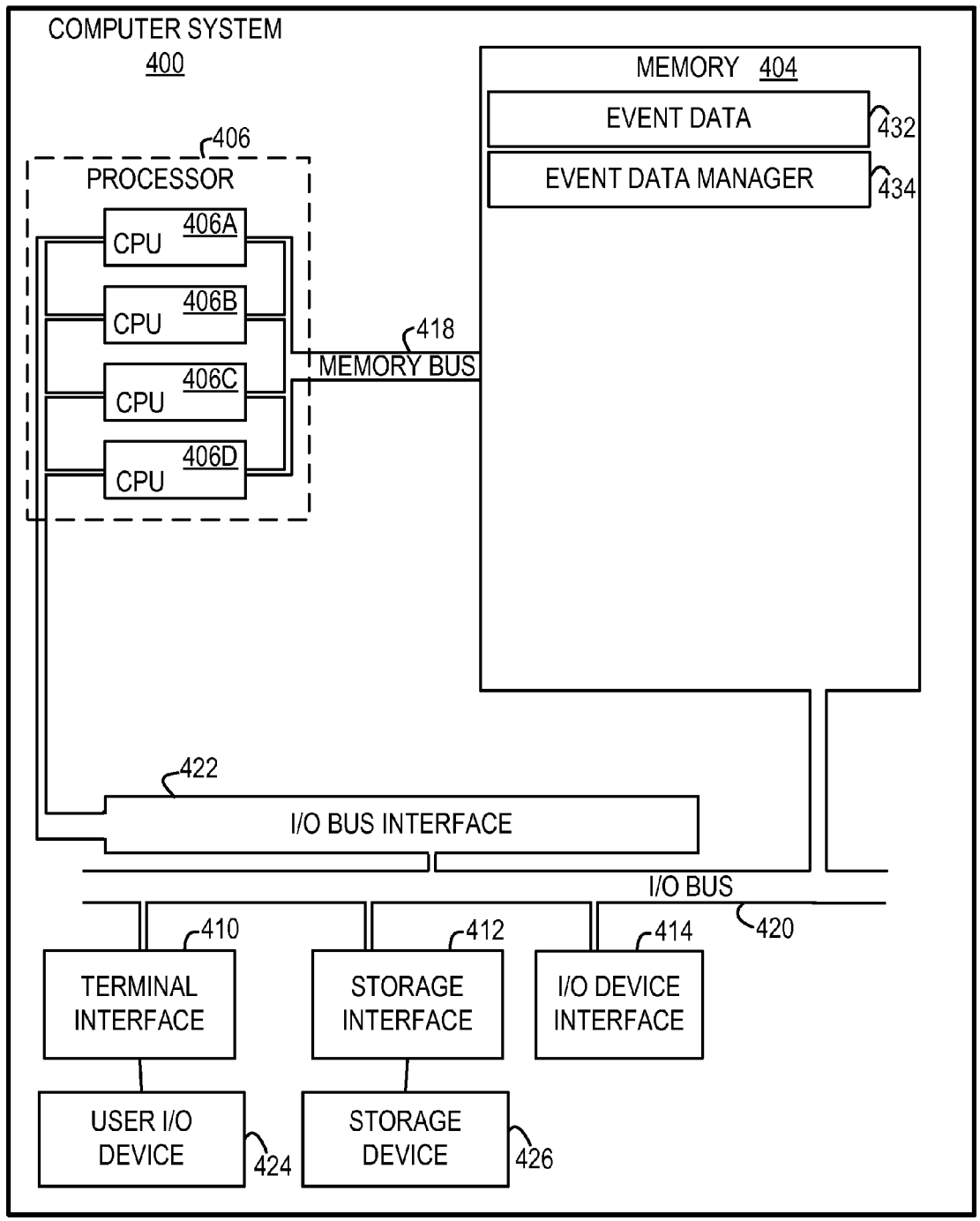
FIG. 4 depicts a computer system for event data management, according to embodiments of the present disclosure.

Referring now to FIG. 4, a computer system 400 for event data management can be seen, according to embodiments of the present disclosure. The mechanisms and apparatus of embodiments of the present invention can apply to various appropriate computing systems. In embodiments, the computer system 400 can include one or more processors 406, a main memory 404, a terminal interface 410, a storage interface 412, an I/O (Input/Output) device interface 414, a user I/O device 424, and a storage device 426. In embodiments, the various aspects of the system 400 are communicatively coupled, directly or indirectly, for inter-component communication via a memory bus 418, an I/O bus 420, and an I/O bus interface unit 422.

The computer system 400 can contain one or more general-purpose programmable central processing units (CPUs) 406A, 406B, 406C, and 406D, herein generically referred to as the processor 406. In embodiments, the computer system 400 can include multiple processors. In embodiments, the processor 406 executes instructions stored in the main memory 408 and can include one or more levels of on-board cache 430.

In embodiments, the main memory 404 can include a random-access semiconductor memory, storage device, or storage medium (either volatile or non-volatile) for storing or encoding data and programs. In some embodiments, the main memory 404 represents the entire virtual memory of the computer system 400, and can also include the virtual memory of other computer systems coupled to the computer system 400 or connected via a network. In embodiments, the main memory 404 is conceptually a single monolithic entity, but in other embodiments the main memory 404 is a more complex arrangement, such as a hierarchy of caches 430 and other memory devices.

In embodiments, the main memory 404 can store all or a portion of the following: event data 432, and event data manager 434. Although the event data 432, and event data manager 434 are illustrated as being contained within the memory 404 in the computer system 400, in some embodiments some or all of them can be on different computer systems and can be accessed remotely, e.g., via a network.

In embodiments, the event data 432 can be the same or substantially similar as event data as described herein. In embodiments, the event data manager 434 can include instructions or statements that execute on the processor 406 to carry out the functions as described with reference to the figures as discussed herein. In embodiments, the event data manager is implemented in hardware via semiconductor devices, chips, logical gates, circuits, circuit cards, and/or other physical hardware devices in lieu of, or in addition to, a processor-based system.

In embodiments, the memory bus 418 provides a data communication path for transferring data among the processor 406, the main memory 404, and the I/O bus interface 422. The I/O bus interface 422 is further coupled to the I/O bus 420 for transferring data to and from the various I/O units. The I/O bus interface unit 422 communicates with multiple I/O interface units 410, 412, 414, 424, and 426 which are also known as I/O processors (IOPs) or I/O adapters (IOAs), through the I/O bus 420.

The I/O interface units support communication with a variety of storage and I/O devices. For example, the terminal interface unit 410 supports the attachment of one or more user I/O devices 424, which can include user output devices (such as a video display device, speaker, and/or television set) and user input devices (such as a keyboard, mouse, keypad, touchpad, trackball, buttons, light pen, or other pointing device). A user can manipulate the user input devices using a user interface, in order to provide input data and commands to the user I/O device 424 and the computer system 400, and can receive output data via the user output devices. For example, a user interface can be presented via the user I/O device 424, such as displayed on a display device, played via a speaker, or printed via a printer.

The storage interface 412 supports the attachment of one or more disk drives or direct access storage devices 426 (which are typically rotating magnetic disk drive storage devices, although they could alternatively be other storage devices, including arrays of disk drives configured to appear as a single large storage device to a host computer). In another embodiment, the storage device 426 can be implemented via any type of secondary storage device. The contents of the main memory 404, or any portion thereof, can be stored to and retrieved from the storage device 426, as needed. The I/O device interface 414 provides an interface to any of various other input/output devices or devices of other types, such as printers or fax machines. The network interface provides one or more communications paths from the computer system 400 to other digital devices and computer systems; such paths can include, e.g., one or more networks.

Although the memory bus 418 is shown in FIG. 4 as a single bus structure providing a direct communication path among the processors 406, the main memory 404, and the I/O bus interface 422, in fact the memory bus 418 can include multiple different buses or communication paths, which can be arranged in various forms, such as point-to-point links in hierarchical, star or web configurations, multiple hierarchical buses, parallel and redundant paths, or any other appropriate type of configuration. Furthermore, while the I/O bus interface 422 and the I/O bus 420 are shown as single respective units, the computer system 400 can, in fact, contain multiple I/O bus interface units 422 and/or multiple I/O buses 420. While multiple I/O interface units are shown, which separate the I/O bus 420 from various communications paths running to the various I/O devices, in other embodiments some or all of the I/O devices are connected directly to one or more system I/O buses.

In various embodiments, the computer system 400 is a multi-user mainframe computer system, a single-user system, or a server computer or similar. In embodiments, the server computer can be a device that has little or no direct user interface, but receives requests from other computer systems (clients). In some embodiments, the computer system 400 is implemented as a desktop computer, portable computer, laptop or notebook computer, tablet computer, pocket computer, telephone, smart phone, or other appropriate type of electronic device.

In embodiments, components other than or in addition to those shown in FIG. 4 can be present, and the number, type, and configuration of such components can vary. The various aspects illustrated in FIG. 4 and implementing various embodiments of the invention can be implemented in a number of manners, including using various computer applications, routines, components, programs, objects, modules, data structures, etc., and can be referred to herein as "software," "computer programs," or simply "programs."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method of event data management, the method comprising:
   receiving a first set of event data indicating computer tracked occurrences, the first set of event data including one or more events classified using local contexts, the local contexts indicating correspondence to a plurality of data flows;
   receiving a second set of event data indicating computer tracked occurrences, the second set of event data including one or more event data classified using the local contexts and using a global context, the global context indicating correspondence to a computer tracked transaction, the computer tracked transaction including one or more of the plurality of data flows;
   determining, using the local contexts, a first subset of event data from the first and second sets of event data, the first subset of event data corresponding to a first data flow of the plurality of data flows, and determining a second subset of event data from the first and second sets of event data, the second subset of event data corresponding to a second data flow of the plurality of data flows;
   determining, using the global context, a first event datum of the first subset and a second event datum of the second subset that corresponds to the computer tracked transaction; and
   establishing, in response to determining the first event datum and the second event datum that correspond to the computer tracked transaction, a global relationship between the first data flow and the second data flow, the global relationship indicating correspondence to the computer tracked transaction;
   receiving a third set of event data indicating computer tracked occurrences, the third set of event data including a third event datum classified, using a local context, as corresponding to the first data flow, the third event datum having a local bookend identifier, the local bookend identifier indicating an end to the first data flow of the plurality of data flows;
   adding, using the local context, the third event datum to the first subset of event data; and
   clearing, in response to determining that the third event datum includes the local bookend identifier, the first subset of event data from computer memory.

2. The method of claim 1, further comprising:
   generating a set of local context metadata in response to adding the third event datum to the first subset of event data and in response to determining that the third event datum includes the local bookend identifier, the set of local context metadata generated using the first subset of event data.

3. The method of claim 1, wherein establishing the global relationship between the first data flow and the second data flow includes:
   classifying each of the event data of the first subset and each of the event data of the second subset as corresponding to the computer tracked transaction.

4. The method of claim 1, wherein the first set of event data is received prior to the second set of event data.

5. The method of claim 1, wherein the second set of event data further includes one or more events classified using a parent context, the parent context indicating correspondence to another local context, and wherein the method further comprises:
   determining, using the parent context, a third event datum of the first subset that is related to the second data flow; and
   establishing, in response to determining that the third event datum is related to the second data flow, a parent relationship between the first data flow and the second data flow, the parent relationship indicating a that the events from the first and second data flows are part of the global context.

6. The method of claim 5, wherein:
   establishing the parent relationship between the first data flow and the second data flow includes:
   adding the first subset of the set of event data to the second subset of the set of event data so that the first subset of the set of event data corresponds to the first data flow and the second data flow.

7. The method of claim 1, further comprising:
receiving a fourth set of event data indicating computer tracked occurrences, the fourth set of event data including a fourth event datum classified using a local context and using the global context, the fourth event datum having a global bookend identifier, the global bookend identifier indicating an end to the computer tracked transaction;
adding, using the local context, the fourth event datum to at least one of the first subset of event data or the second subset of event data;
generating a set of global context metadata in response to adding the fourth event datum to at least one of the first subset or the second subset and in response to determining that the fourth event datum includes the global bookend identifier, the set of global context metadata generated using the first subset and the second subset; and
clearing, from computer memory, the first subset of event data and the second subset of event data in response to generating the set of global context metadata.

8. The method of claim 7, wherein clearing the first subset of event data and the second subset of event data is further in response to expiration of a time based interval that begins in response to determining that the third event datum includes the global bookend identifier.

9. A system of event data management, the system comprising:
a processor; and
a computer readable storage medium having program instructions embodied therewith, the program instructions executable by the processor to cause the system to:
receive a first set of event data indicating computer tracked occurrences, the first set of event data including one or more events classified using local contexts, the local contexts indicating correspondence to a plurality of data flows;
receive a second set of event data indicating computer tracked occurrences, the second set of event data including one or more event data classified using the local contexts and using a global context, the global context indicating correspondence to a computer tracked transaction, the computer tracked transaction including one or more of the plurality of data flows;
determine, using the local contexts, a first subset of event data from the first and second sets of event data, the first subset of event data corresponding to a first data flow of the plurality of data flows, and determining a second subset of event data from the first and second sets of event data, the second subset of event data corresponding to a second data flow of the plurality of data flows;
determine, using the global context, a first event datum of the first subset and a second event datum of the second subset that corresponds to the computer tracked transaction; and
establish, in response to determining the first event datum and the second event datum that corresponds to the computer tracked transaction, a global relationship between the first data flow and the second data flow, the global relationship indicating correspondence to the computer tracked transaction;
receive a third set of event data indicating computer tracked occurrences, the third set of event data including a third event datum classified, using a local context, as corresponding to the first data flow, the third event datum having a local bookend identifier, the local bookend identifier indicating an end to the first data flow of the plurality of data flows;
add, using the local context, the third event datum to the first subset of event data; and
clear, in response to determining that the third event datum includes the local bookend identifier, the first subset of event data from computer memory.

10. The system of claim 9, wherein the program instructions executable by the processor further cause the system to generate a set of local context metadata in response to adding the third event datum to the first subset of event data and in response to determining that the third event datum includes the local bookend identifier, the set of local context metadata generated using the first subset of event data.

11. The system of claim 9, wherein the program instructions executable by the processor to cause the system to establish the global relationship between the first data flow and the second data flow, further causes the system to:
classify each of the event data of the first subset and each of the event data of the second subset as corresponding to the computer tracked transaction.

12. The system of claim 9, wherein the first set of event data is received prior to the second set of event data.

13. The system of claim 9, wherein the second set of event data further includes one or more events classified using a parent context, the parent context indicating correspondence to another local context, and wherein the program instructions executable by the processor further cause the system to:
determine, using the parent context, a third event datum of the first subset that is related to the second data flow; and
establish, in response to determining that the third event datum is related to the second data flow, a parent relationship between the first data flow and the second data flow, the parent relationship indicating a that the events from the first and second data flows are part of the global context.

14. The system of claim 13, wherein program instructions executable by the processor to cause the system to establish the parent relationship between the first data flow and the second data flow, includes causing the system to:
add the first subset of the set of event data to the second subset of the set of event data so that the first subset of the set of event data corresponds to the first data flow and the second data flow.

15. The system of claim 9, wherein the program instructions executable by the processor further cause the system to:
receive a fourth set of event data indicating computer tracked occurrences, the fourth set of event data including a fourth event datum classified using a local context and using the global context, the fourth event datum having a global bookend identifier, the global bookend identifier indicating an end to the computer tracked transaction;
add, using the local context, the fourth event datum to at least one of the first subset of event data or the second subset of event data;
generate a set of global context metadata in response to adding the fourth event datum to at least one of the first subset or the second subset and in response to determining that the fourth event datum includes the global bookend identifier, the set of global context metadata generated using the first subset and the second subset; and clear, from computer memory, the first subset of event data and the second subset of event data in response to generating the set of global context metadata.

16. The system of claim 15, wherein program instructions executable by the processor to cause the system to clear the first subset of event data and the second subset of event data is further in response to expiration of a time based interval that begins in response to determining that the third event datum includes the global bookend identifier.

17. A non-transitory computer readable storage medium for event data management, the computer program product comprising a computer readable storage medium having program instructions embodied therewith, wherein the computer readable storage medium is not a transitory signal per se, the program instructions executable by a computer to cause the computer to perform a method comprising:
- receiving, by the computer, a first set of event data indicating computer tracked occurrences, the first set of event data including one or more events classified using local contexts, the local contexts indicating correspondence to a plurality of data flows;
- receiving, by the computer, a second set of event data indicating computer tracked occurrences, the second set of event data including one or more event data classified using the local contexts and using a global context, the global context indicating correspondence to a computer tracked transaction, the computer tracked transaction including one or more of the plurality of data flows;
- determining, by the computer, using the local contexts, a first subset of event data from the first and second sets of event data, the first subset of event data corresponding to a first data flow of the plurality of data flows, and determining a second subset of event data from the first and second sets of event data, the second subset of event data corresponding to a second data flow of the plurality of data flows;
- determining, by the computer, using the global context, a first event datum of the first subset and a second event datum of the second subset that corresponds to the computer tracked transaction; and
- establishing, by the computer, in response to determining the first event datum and the second event datum that corresponds to the computer tracked transaction, a global relationship between the first data flow and the second data flow, the global relationship indicating correspondence to the computer tracked transaction;
- receiving, by the computer, a third set of event data indicating computer tracked occurrences, the third set of event data including a third event datum classified, using a local context, as corresponding to the first data flow, the third event datum having a local bookend identifier, the local bookend identifier indicating an end to the first data flow of the plurality of data flows;
- adding, by the computer, using the local context, the third event datum to the first subset of event data; and
- clearing, by the computer, in response to determining that the third event datum includes the local bookend identifier, the first subset of event data from computer memory.

18. The non-transitory computer readable storage medium of claim 17, wherein the program instructions executable by the computer cause the computer to perform the method further comprising:
- generating a set of local context metadata in response to adding the third event datum to the first subset of event data and in response to determining that the third event datum includes the local bookend identifier, the set of local context metadata generated using the first subset of event data.

19. The non-transitory computer readable storage medium of claim 17, wherein establishing the global relationship between the first data flow and the second data flow includes:
- classifying each of the event data of the first subset and each of the event data of the second subset as corresponding to the computer tracked transaction.

20. The non-transitory computer readable storage medium of claim 17, wherein the first set of event data is received prior to the second set of event data.

* * * * *